United States Patent [19]
Fenton

[11] 3,985,417
[45] Oct. 12, 1976

[54] COUPLING DEVICE FOR ELECTRICAL FIXTURE

[75] Inventor: Hugh Miles Roxburgh Fenton, Vancouver, Canada

[73] Assignee: Russell William Richardson, Coquitlam, Canada

[22] Filed: Apr. 24, 1975

[21] Appl. No.: 571,059

[52] U.S. Cl. .......................... 339/122 F; 339/185 R; 339/189 R
[51] Int. Cl.² .......................................... H01R 13/32
[58] Field of Search ................ 339/122 F, 188–190, 339/184, 185, 90

[56] References Cited
UNITED STATES PATENTS

| | | | |
|---|---|---|---|
| 1,495,701 | 5/1924 | McLean | 339/189 R |
| 2,102,625 | 12/1937 | Hubbell, Jr. | 339/184 R |
| 2,345,414 | 3/1944 | Mueller | 339/189 L |
| 2,348,665 | 5/1944 | Von Gehr | 339/190 |
| 2,680,839 | 6/1954 | Peters | 339/189 L |
| 3,798,584 | 3/1974 | Person | 339/189 R |

*Primary Examiner*—Roy Lake
*Assistant Examiner*—Neil Abrams
*Attorney, Agent, or Firm*—Carver and Company

[57] ABSTRACT

Coupling device for coupling releasably electrical fixture to electrical outlet adjacent building surface. Device has female assembly connected to electrical outlet box and power, the assembly having three female supporting lugs with engagement means. Respective electrical contacts are secured adjacent each lug and spaced from lug to provide gap between the lug and contact. Male assembly is connected to fixture and has three complementary male supporting lugs with engagement means complementary to the respective engagement means of female lug. Each male lug has contact extending along upper surface thereof to fit between female lug and respective contact. When male assembly is inserted into the female assembly and rotated relative thereto, engagement means of each lug engage complementary engagement means of opposite lug and respective contacts are forced into and maintain engagement so as to conduct electricity. Engagement means essentially prevent accidental rotation leading to disconnection, and female lugs shield live contact in disconnected fixture, thus reducing electrical shock hazard.

10 Claims, 7 Drawing Figures

COUPLING DEVICE FOR ELECTRICAL FIXTURE

BACKGROUND OF THE INVENTION

1. Field of the Invention

The invention relates to a coupling device for an electrical fixture, in particular a coupling device adapted for ceiling or wall mounted fixtures in which complementary portions of the device are quickly connectable and disconnectable, to allow the fixture to be quickly and safely connected to or disconnected from a standard outlet box.

2. Prior Art

Quickly connectable and disconnectable electrical coupling devices are known in which a female portion of the fixture is mounted in the wall or ceiling, i.e. in the building surface, and is connected to electrical power, and a complementary male portion connected to the fixture is fitted in the female portion to connect the fixture to power. Some of the devices known to the present inventor are adapted to be secured to a non-standard outlet box adjacent the wall or ceiling, and thus are not interchangeable with present fixtures. This introduces problems relating to obsolescence and inventory and in general these coupling devices have not been generally accepted, possibly for these reasons.

Other coupling devices that can be fitted to standard outlet boxes are unsatisfactory for other reasons. A typical fault is that accidental relative movement between portions of the device, for example slight rotation resulting from rotation or swinging of the fixture, can result in unintentional disconnecting of the devices which results in the fixture falling from the ceiling. Another fault is that in some coupling devices the electrical contact members themselves bear weight of the fixture. With some heavy fixtures this could result in deformation causing misalignment of the contacts so that contact is intermittent. With a relatively light fixture electrical contact between one pair or more of contacts may be lost. A further fault is that when the male portion of the coupling is removed, live contacts in the female portion are exposed to touch, thus risking electrical shock to an inexperienced person. A still further fault with some coupling devices is that, if a short circuit occurred in the fixture, the fixture could become live as no ground connection is provided. Some coupling devices are provided with ground contacts but these make contact simultaneously with the power contacts and thus an electrical shock could still result.

Most of these devices require accurate location of the outlet box relative to the building surface so that the female portion can be correctly mounted to ensure that the coupling presents a satisfactory appearance when the male portion is connected. Thus a small variation in fitting of the outlet box relatively to the building surface results in the female portion being recessed too far within the building surface, or projecting too far from the surface. If a prior art device were fitted to an inaccurately located outlet box as above, when the male portion is connected the result is unsightly. In the building trade location inaccuracies as above are to be expected because it is common practice that electrical fixtures such as outlet boxes are installed by electricians, whereas the inner walls of the building, that is the dry-wall panels or wood panelling, are installed by other trades at a later date. As the two trades work independently, it is not unusual for the positions of outlet boxes and the building surfaces to vary within a range of about one centimeter. Also it is rare for an outlet box to be mounted parallel with the building surface. In some detachable coupling devices known to the inventor there is little accommodation to the dimensional variations above and thus fitting of such devices to badly fitted outlet boxes is unsightly.

SUMMARY OF THE INVENTION

The invention reduces several of the disadvantages of the prior art by providing a coupling device for electrical fixtures which can be fitted to a standard outlet box, has increased tolerance to errors in location of the outlet box relative to the building surface, and also provides structure which substantially eliminates chances of accidental disconnection of the male and female portions. The invention also provides lugs to bear the weight of the device and electrical contact between each pair of complementary contacts is made by spring forces of one of the contacts so that deformation of a lug or lugs would likely not result in loss of contact. Live contacts in the female portion are shielded so as to substantially eliminate chances of receiving an electrical shock when the male portion of the coupling is disconnected.

The device according to the invention has a female assembly serving as the electrical outlet and is adapted to be connected to electrical power and to be attached to an outlet box adjacent the building surface, and a complementary male assembly connected to the electrical fixture. The female assembly includes a hollow body having an inner surface and upper and lower ends. The female assembly also includes attachment means cooperating with the body for connecting the body to the outlet box so that the female assembly is essentially adjacent the building surface. The female assembly further includes three circumferentially spaced female supporting and contacting means extending inwardly from the inner surface of the body. Each supporting and contacting means has a circumferentially extending female lug having engagement means, and an electrically conducting resilient contact member secured adjacent the lug and adapted to be connected to an appropriate conductor. The contact member has a forward edge spaced from the lug to provide a gap between the lug and the contact member. The male assembly includes an outer plate having means to permit electrical connection to electrical conductors from the electrical fixture, and means adapted to carry the fixture. The male assembly further includes three circumferentially spaced male supporting and contacting means extending upwards from the plate. Each male supporting and contacting means has a circumferentially extending male lug having engagement means complementary to the respective engagement means of the female lug, and a contact member extending along an upper surface of the male lug and adapted to be connected to a conductor of the fixture. Each lug and contact member of the male assembly are adapted to be accepted in the respective gap between the lug and contact member of the female assembly. Thus, when the lugs of the male assembly are moved into the respective gaps of the female assembly and the male assembly is rotated relative to the female assembly, the engaging means of each female lug engages the complementary engaging means of the respective male lug so as to restrict rotation between the male and female assemblies to prevent substantially accidental disconnection of the assemblies. Substantially simultaneously the respective contact members are forced into and maintain engagement so as to conduct electricity.

A detailed disclosure following, related to drawings, describes a preferred embodiment of the invention, which however is capable of expression in structure other than that particularly described and illustrated.

DETAILED DISCLOSURE

Figure 1:
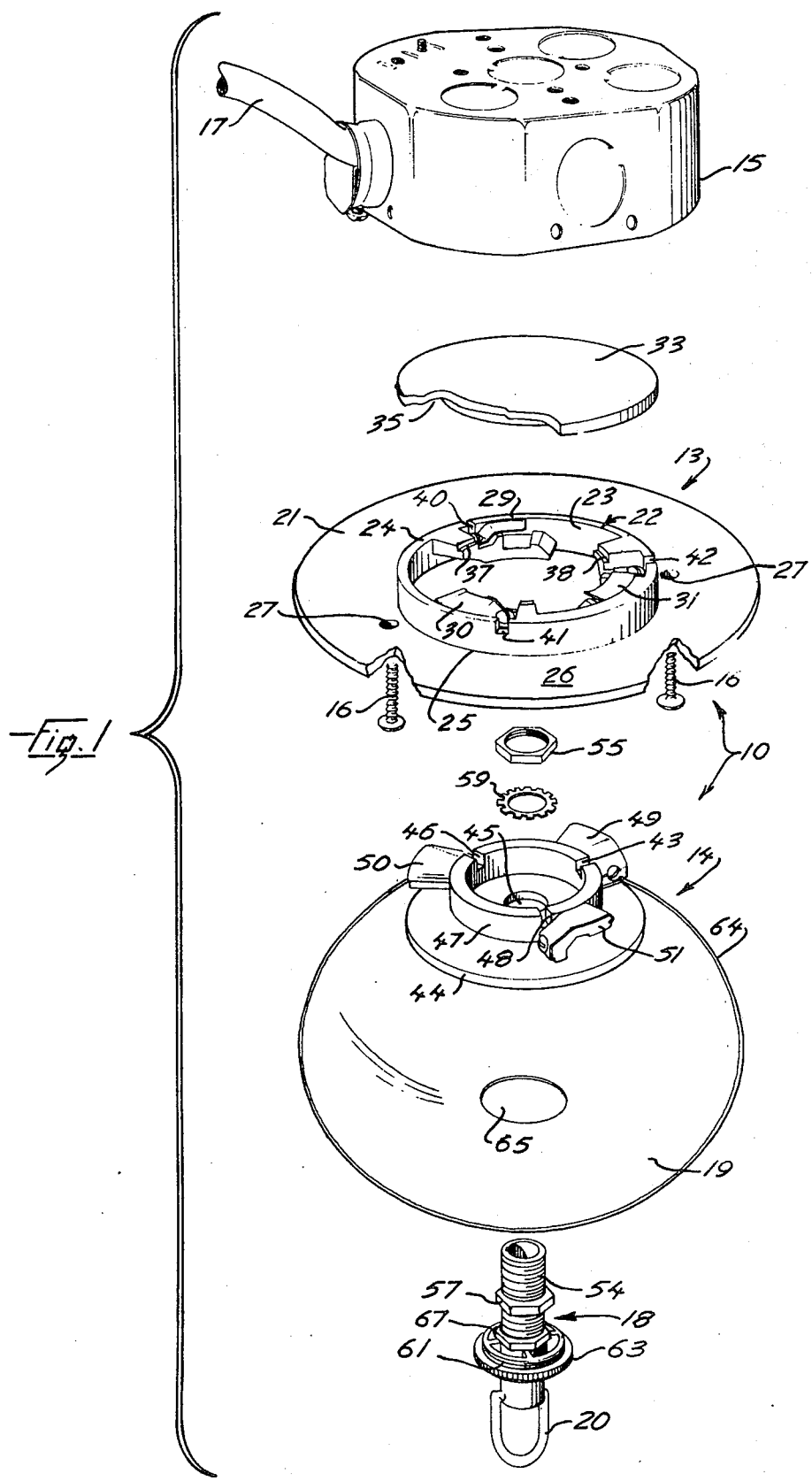
FIG. 1 is a simplified partially fragmented exploded perspective of main portions of the invention, electrical wire being removed.
Figure 2:
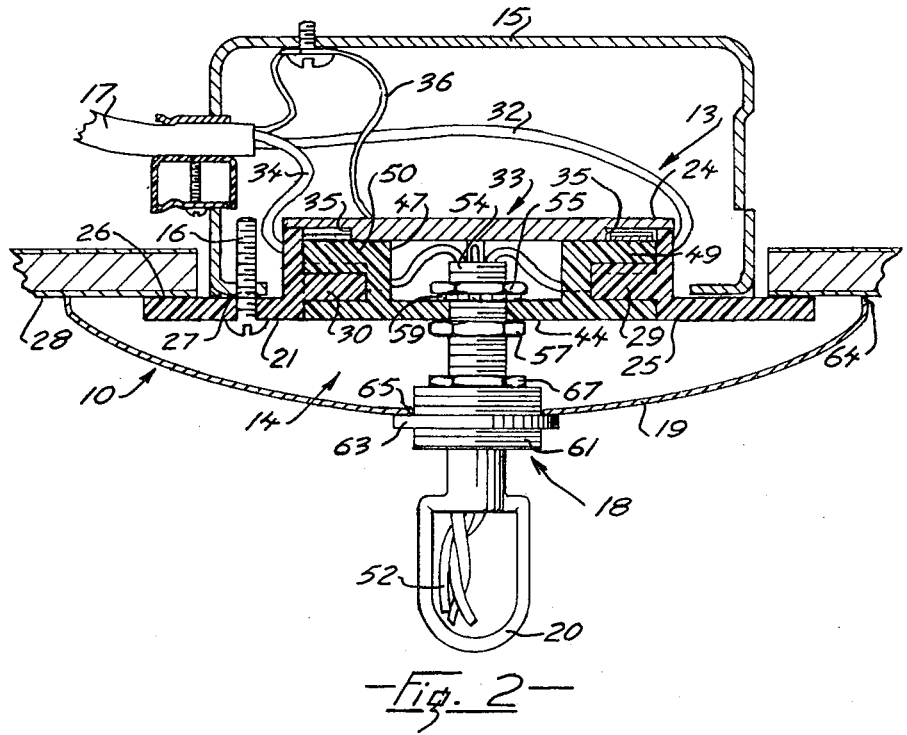
FIG. 2 is a vertical section through an assembled coupling device of the invention shown secured to an outlet box fitted flush with a building surface, planes of the section being on inclined radii of the device generally according to line 2—2 of FIG. 6.

FIGS. 1 and 2

An electrical fixture coupling device 10 according to the invention has a female assembly 13 and a complementary male assembly 14. The female assembly is adapted to be connected by two screws 16 to a standard outlet box 15 mounted flush in the ceiling, and a three-core electrical cable 17 connects the female assembly to electrical power. The male assembly 14 has a fixture connector 18 having a ring 20 from which a light fixture or other electrical device can be supported. A domed cover plate 19 fitted on the connector encloses the device when assembled.

The female assembly has a hollow body 22 having an inner cylindrical surface 23 and upper and lower ends 24 and 25. An annular flange 21 extends peripherally around the lower end 25 to enclose the open end of the outlet box 15. The flange 21 has an upper surface 26 in contact with portions of a ceiling 28 of a room, hereinafter termed building surface. Opening 27 in the flange 21 accept the screws 16 for securing the assembly 13 so that the flange 21 contacts the surface 28 as shown. As will be described with reference to FIGS. 3 and 4, if the outlet box is inaccurately fitted to framework, that is outer edges of the outlet box are not flush with the ceiling, the device 10 can accommodate inaccurate fitting to some extent. The screws 16 thus serve as attachment means cooperating with the body 22 for connecting the body to the outlet box so as to be essentially adjacent the building surface in most situations having normal dimensional variations.

The female assembly also includes three circumferentially spaced, generally arcuate, female supporting and contacting means 29, 30 and 31 which extend inwardly from the inner surface 23 and are connected to appropriate live, neutral and ground wires 32, 34 and 36 respectively from the cable 17 so as to be polarized live, neutral and ground respectively. As is common practice, the ground wire 36 is also connected to the outlet box 15.

An inner plate 33 has a stepped circular rim 35 and is adapted to fit adjacent the upper end 24 of the body. The stepped rim engages complementary partially annular grooves in the means 29, 30 and 31, grooves 37 and 38 in the means 29 and 31 only being visible in FIG. 1. As will be described with reference to FIG. 5, the means 29, 30 and 31 each have a lug to support a portion of the weight of the fixture, and a contact member connected to the appropriate wire. The plate 33 fits adjacent the upper end 24 to essentially seal the open upper end against accidental short-circuiting within the outlet box between wires themselves and the contact members. The upper end 24 has clearance grooves 40, 41 and 42 to provide clearance for wires from the cable 17 passing to the appropriate contact members.

The male assembly 14 includes an outer plate 44 having a central opening 45 to provide clearance for electrical wires from the electrical fixture (not shown) and also receives the fixture connector 18 so as to support the fixture. The plate 44 has a cylindrical wall member 47 extending upwards from the plate, the wall member having an outer diameter to fit between inwardly facing inner walls of the female lugs. The wall member supports inner portions of three circumferentially spaced, generally arcuate, male supporting and contacting means 49, 50 and 51 extending upwards from the plate. The means 49, 50 and 51 are connected to appropriate wires in a wire bundle 52 from the fixture and are adapted to be brought into engagement with the respective female supporting and contacting means 29, 30 and 31 in the female assembly 13 so as to be polarized live, neutral and ground respectively. Clearance grooves 43, 46 and 48 in the wall 47 provide clearance for wires from the fixture extending from the bundle 52 to the means 49, 50 and 51 respectively. The grooves 43, 46 and 48 and the opening 45 are thus means to permit electrical connection to conductors extending from the fixture.

The fixture connector 18 has a threaded body 54 having a diameter to be accepted in the opening 45, inner and outer nuts 55 and 57 and a locking washer 59 securing the connector 18 to the plate 44. The connector 18 has a larger diameter threaded sleeve 61 screwed onto the body 54 to be adjacent the ring 20, and carrying a threaded ring 63. The domed plate 19 has a central opening 65 to accept the threaded sleeve 61 and a third nut 67 locks the sleeve 61 relative to the body 54. The plate 19 has a coplanar outer periphery 64 which can be brought into contact with the building surface 28 and an outer diameter sufficient to enclose the assemblies to produce an acceptable exterior in which portions of the device 10 above the threaded sleeve 61 are not visible. Adjustment of the sleeve 61 on the body 54 and the ring 63 on the sleeve 61 accommodates to some extent an outlet box which has been inaccurately fitted and projects excessively from the ceiling. Thus, the cover plate 19 can be adjusted relative to the ceiling so that the outer periphery 64 thereof can be brought to engage the ceiling to produce an acceptably fitting cover plate enclosing the coupling device. The sleeve 61 is thus a threaded portion of the body 54.

Figure 3:
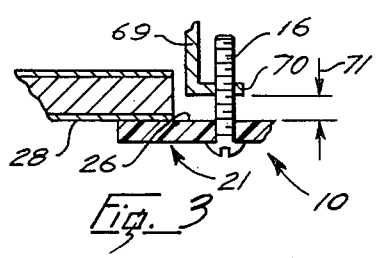
FIG. 3 is a fragmented detail section generally on a portion of line 2—2 of FIG. 6 in which the outlet box is recessed into the building surface.
Figure 4:
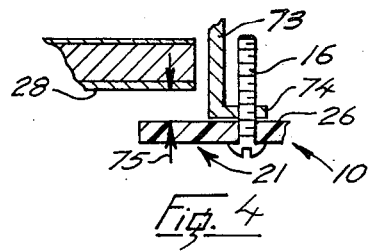
FIG. 4 is a fragmented detail section generally on a portion of line 2—2 of FIG. 6 in which the outlet box projects from the building surface.

FIGS. 3 and 4

As previously stated, FIG. 2 shows the coupling 10 fitted on the outlet box 15 mounted essentially flush with the surface 28. FIG. 3 shows the coupling 10 fitted to a similar outlet box 69 recessed in the surface 28, that is an outer rim 70 of the box is spaced a distance 71 inwards of the surface 28. The screw 16 is tightened until the surface 26 of the flange 21 contacts the surface 28 which permits an acceptable fitting of the plate 19.

FIG. 4 shows the coupling 10 fitted to a similar outlet box 73 which projects outwards from the surface 28, that is an outer rim 74 of the box is spaced a distance 75 from the ceiling. The screw 16 is tightened until the surface 26 of the flange 21 contacts the outer rim 74 which thus closes the outlet box but leaves a peripheral gap equal to the distance 75 extending around the flange 21. When the domed cover plate is fitted, the peripheral gap cannot be seen and thus the error in fitting the box is not readily discernible.

FIG. 5

The female supporting and contacting means 29 for the live wire has a circumferentially extending female lug 77 having a forward portion 79, an intermediate portion 80 and a rear portion 81. The intermediate portion has an upwardly facing recess 83 having a circumferential length 84. The forward portion has a ridge 86 defining a rear facing shoulder 87 adjacent a forward end of the recess 83, and a maximum depth 89 defined as spacing of an uppermost surface 90 from an opposite lowermost surface 91 of the forward portion. An inclined ramp face 93 extends from the uppermost surface 90 to a nose 94 of the forward portion. The shoulder 87 is a reverse rotation restricting engaging means as will be described.

An electrically conducting resilient contact member 97 is secured to the rear portion 81 by a rivet 102 and extends circumferentially adjacent the recess 83 and spaced from an uppermost surface of the recess. The contact member 97 has an upwardly turned forward edge or lip 101 and a gap 100 is defined between the ridge and an undersurface of the contact member 97 at the edge 101. When the assemblies 13 and 14 are disconnected, resiliency in the contact member 97 reduces the size of the gap 100, and when the assemblies are being engaged, the size of the gap 100 momentarily increases to permit the male portion to pass. A rear end of the contact member 97 has an opening 99 to accept a screw 98 for securing the live wire (not shown) in electrical contact with the contact member. The screw when tightened further secures the contact member to the lug so that rotation of the contact member relative to the lug is essentially prevented.

The male supporting and contacting means includes a male lug 105 having a forward portion 107, an intermediate portion 108 and a rear portion 109. The intermediate portion has a downwardly facing recess 111 spaced from an upper surface 112 of the plate 44 so as to accept the forward portion 79 of the female assembly therebetween. The forward portion of the male lug has a downwardly extending ridge 114 defining a rear facing shoulder 115 adjacent a forward end of the recess. Length of the ridge 114 is defined as space between the shoulder 115 and a nose 117 of the forward portion, which length is less than circumferential length 84 of the recess 83 of the female lug to permit engagement of the shoulders 87 and 115 and entry of the male forward portion into the recess of the female portion. Spacing between a lower face of the ridge 114 and the surface 112 is greater than the depth 89 to permit entry of the male lug. The shoulder 115 is a reverse rotation restricting engaging means complementary to the engaging means of the respective female lug to restrict reverse rotation between the assemblies when the engaging means are engaged as will be described. Interference between the forward portion 94 and the rear portion 109 prevents further forward rotation of the male coupling and thus relative rotation in two directions is prevented. The lugs thus have bi-directional rotation restricting engagement means. Note that depths of the shoulders 87 and 115 are substantially equal and are shown exaggerated for clarity, a typical 0.5mm. being 0.5mm. for a domestic sized fitting.

An electrically conducting contact member 118 extends along an upper surface of the male lug and contacts the contact member 97 when the assemblies are engaged. A rear end of the contact member has an opening 120 to accept a screw 121 to secure a respective electrical wire (not shown) to the contact member and also augments securing of the contact plate to the rear portion 109. The contact member 118 is secured to the lug by a backwardly and inwardly turned forward lip 123 at a forward end thereof and a forwardly and inwardly turned rear lip 124 at a rear end thereof. The nose 117 of the male lug has a complementary recess to accept the lip 123 so as to produce a smooth nosed forward end of the male lug to facilitate engagement of the contact members of the male and female assemblies. The rear lip 124 engages a complementary recess in the rear portion 109 of the lug, so that the contact member is located at opposite ends.

The lug and contact member of the male assembly are shaped and adapted to be accepted in the gap between the lug and contact member of the female assembly. The inclined ramp face 93 of the female forward portion 79 engages the nose 117 of the male forward portion 107 and tends to wedge the male lug upwards up the ramp to facilitate initial engagement of the male and female assemblies. The upwardly turned lip 101 of the contact member 97 is inclined away from the recess 83 and the ridge 86 so as to lead the portion 107 and member 118 between the lug 77 and member 97 to facilitate initial engagement of the contact members. The initial engagement of the contact members tends to force the female contact member 97 upwards, to increase size of the gap 100 to pass the male lug, but a lower surface 126 of the inner plate 33 is spaced closely to the contact member 97 to limit this upwards movement. This essentially eliminates chances of permanently straining the female contact 97, that is the deformation of the contact member 97 is below the elastic limit thereof. Thus permanent deformation is prevented and adequate contact between the contact members is maintained at all times.

Figure 5:
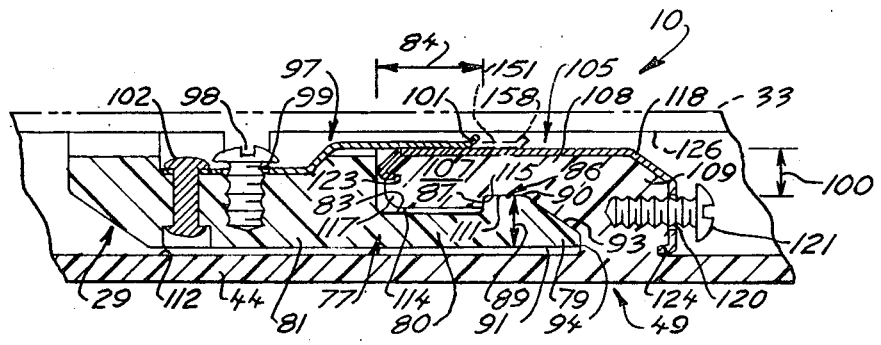
FIG. 5 is a fragmented detail section showing cooperation between one pair of complementary male and female assemblies of the device, the section being generally on curved line 5—5 of FIG. 6.
Figure 6:
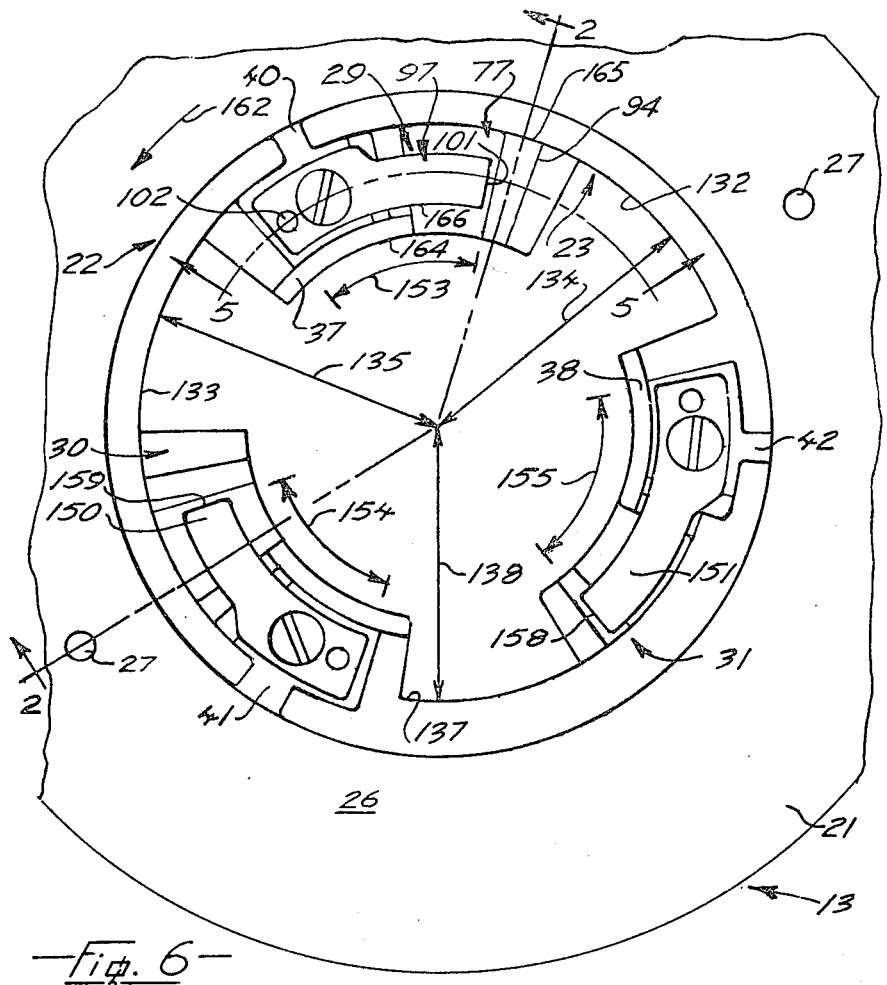
FIG. 6 is a simplified top plan of a female assembly of the invention as seen looking into the female assembly from a position within the outlet box, some portions being omitted.
Figure 7:
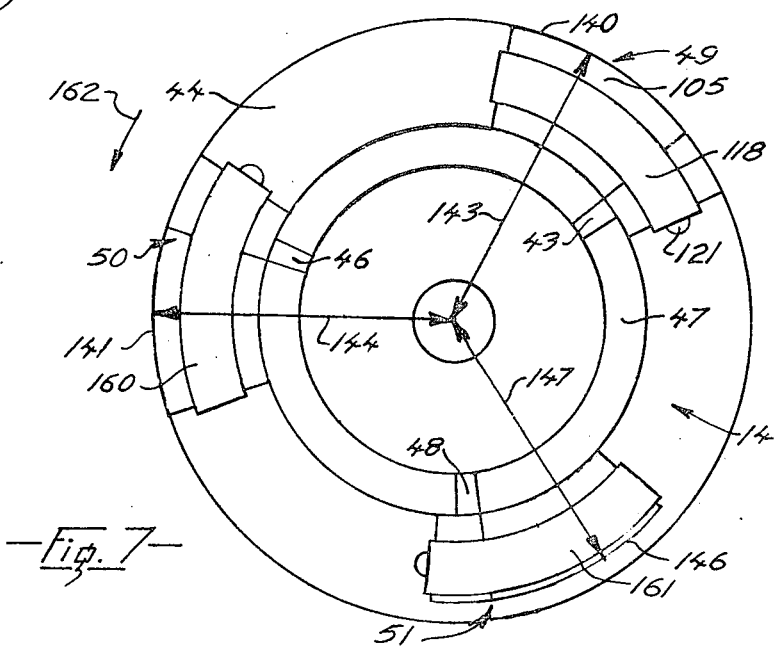
FIG. 7 is a simplified top plan of a male assembly of the invention, some portions being omitted.

FIGS. 5, 6 and 7

As previously stated the contact members 29, 30 and 31 of the female assembly and the contact members 49, 50 and 51 of the male assembly are each polarized so as to be live, neutral and ground respectively.

Referring to FIG. 6, portions of the inner surface 23 between the female supporting and contacting means 29 and 31, and between the means 29 and 30, are designated 132 and 133 respectively and have equal radii 134 and 135. A portion of the surface 23 between the means 31 and 30 is designated 137 and has a radius 138 which is less than the radii 134 and 135. Referring to FIG. 7 outer walls 140 and 141 of the live and neutral male means 49 and 50 have equal radii 143 and 144, and to permit engagement of the male and female assemblies the radii 134 and 135 of FIG. 6 are somewhat larger than the radii 143 and 144 of FIG. 7. An outer wall 146 of the ground male means 51 of FIG. 7 has a radius 147 which is less than the radii 143 and 144 and slightly less than the radius 138 of FIG. 6 so as to permit insertion of the means 51 adjacent the portion 137 for initial engagement of the male and female assemblies. Note that the larger radii 143 and 144 of the walls 140 and 141 of the means 49 and 50 prevent insertion of either of those means adjacent the surface portion 137.

Thus, one particular lug of the male assembly has an outer wall spaced at a different radial spacing than the corresponding outer walls of the remaining two lugs of the male assembly. Similarly a portion of the inner surface 23 of the hollow body extending forward of the female lug complementary to the particular male lug has a radial spacing complementary to the radial spacing of the particular male lug so as to accept only that particular male lug. Thus if any male means other than the ground means 51 were positioned between the female means 30 and 31, interference would result and initial engagement could not be attained. This serves to limit initial engagement of the assemblies to one relative position, thus maintaining correct polarity between conductors of the assemblies. Other means to limit engagement as above can be devised.

As previously stated, the supporting and contacting means 49 has a contact member 97 which is polarized live. Referring to FIG. 6, the female means 30 and 31 have similar contact members 150 and 151 serving as neutral and ground contact members respectively. The contact members are essentially equal except that circumferential lengths 153 and 154 of the live and neutral contact members 97 and 150 are less than circumferential length 155 of the ground contact member 151. For convenience, circumferential length is defined as spacing measured along an inner arc length of the contact member between forward and rear edges thereof. The measurement is a maximum length as viewed axially and extends between the rear edge adjacent the rivet and the upturned forward edge. For equally spaced rivets, i.e. spaced at 120° to each other, the longer ground contact member results in a circumferentially advanced forward edge 158 of the ground contact member. That is the forward edge 158 is advanced circumferentially relative to the forward edges 101 and 159 of the live and neutral contact members.

Referring only to FIG. 5, a comparison of the positions of the forward edge 101 of the live contact member 97, shown in full outline, and the forward edge 158 of the ground contact member 151, shown in broken outline, illustrates the additional length of the ground contact member 151.

With reference to FIG. 7, the male assembly has neutral and ground contact members 160 and 161 respectively which are essentially similar to the live contact member 118. All portions of the male contact members are spaced equally from each other, that is each forward portion and contact member is spaced from an adjacent forward portion and contact member by 120°. Thus, when the male and female assemblies are brought into engagement, and the male assembly 14 is rotated relative to the female assembly 13 according to an arrow 162, the circumferentially advanced forward edge 158 of the female ground contact member 151 contacts the male ground contact member 161 before contact is made between the live and neutral contact members. Conversely, when the male and female assemblies are disengaged, the advanced forward edge 158 of the ground contact member 151 results in separation of the ground contact members 151 and 161 after separation of the live or neutral contact members. Thus at all times whilst the fixture is supplied with electricity it is safely grounded, which is common practice and is required in many electrical codes. Other means of ensuring that the ground contact members engage before engagement of the live and neutral contact members, and disengage after disengagement of the live and neutral contact members can be devised.

Referring again to FIG. 6 it can be seen that when the female assembly 13 is viewed axially each contact member is smaller than its respective lug. The female lug 77 has inner and outer peripheries 164 and 165, the outer periphery being generally adjacent the inner surface 23 of the body. The female contact member 97 has an inner periphery 166 spaced radially outwardly of the inner periphery 164. The forward edge 101 of the member 97 is spaced rearwardly of the nose 94 of the lug 77. Thus the inner periphery of the lug extends radially inward beyond the inner periphery of the contact member, and the nose 94 extends beyond the edge 101 so as to shield effectively the contact member from unintentional contact from outside the fixture. Thus, if the male assembly were disengaged from the female assembly after installation, and the female assembly were live, insertion of a conductor or finger into the female assembly, in all likelihood, would not result in accidental contacting of the live contact member.

It is noted that weight of the fixture is borne by the lugs, which can be injection molded in a suitably tough plastic. Electrical contact is essentially independent of weight of the fixture and is maintained by the spring pressure from the contact members of the female assembly. The female contact members have limited movement sufficient only for disengagement of the assemblies and thus are prevented from being strained permanently. Thus electrical contact should be essentially unchanged after many engagements and disengagements of fixtures having widely varying weights.

INSTALLATION AND OPERATION

The male assembly is secured to the light fixture in a normal manner, with the wires 52 from the fixture being secured to the appropriate contact members. For hanging fixtures the fixture connector 18 can be used, and for rigidly mounted fixtures equivalent connectors can be substituted as is common practice.

The female assembly can be substituted for a standard crossbar connection on the outlet box 15, and the three wires from the electrical cable 17 are connected to appropriate contact members. The inner plate 33 is snapped into place so as to present an insulated and sealed upper surface of the female assembly to prevent accidental short circuiting of the wires within the outlet box. The screws 16 secure the female assembly to the outlet box and, to accommodate normal tolerances between the outlet box and the building surface 28, the screws are adjusted so that the surface 26 contacts the surface 28 as in FIGS. 2 and 3, or the outlet box as in FIG. 4. When secured, power can be supplied to the female assembly with negligible chances of accidental contact or short circuiting.

To couple the male and female assemblies it is not essential to switch off power to the outlet box. The male assembly is positioned coaxially relative to the female assembly so that the male supporting and contacting means 51 associated with the ground wire is positioned to be adjacent and below the portion 137 of the inner surface 23, that is between the ground and neutral female means 31 and 30. The male assembly is forced upwards, i.e. inwards, and enters the female assembly and is rotated in direction of the arrow 162, shown anticlockwise in FIG. 6, but clockwise as viewed looking upwards into the female assembly. This causes the forward portion of each male assembly to ride up the ramp face of the complementary female portion until the ridge of the male portion rides on the ridge of the female portions so that the contact members contact each other. When the contact members initiate engagement, upward force from the male contact member against the female contact member is resisted by the lower surface 126 of the inner plate 33, thus reducing chances of permanently deforming the contact members of the female assembly. Further relative rotation causes more sliding between the contact members until the adjacent shoulders become aligned permitting the forward portions to snap into appropriate recesses. This permits the female contact member to move downwards slightly still maintaining contact with its complementary male contact member. Note that when the shoulders of complementary male and female lugs are engaged, reverse rotation i.e. rotation in an opposite direction between the male and female assemblies is restricted. The convex cover plate 19 is then positioned on the threaded sleeve 61 and the ring 63 is threaded onto the sleeve 61 and is rotated to urge the outer periphery 64 of the plate 19 into intimate contact with the building surface 28.

To disengage the male and female assemblies, the ring 63 is unscrewed permitting the plate 19 to be moved away from the surface 28. The connector 18 is gripped and forced upwards resulting in relative axial movement between the male and female assemblies to produce sliding on the shoulders 87 and 115. Such axial movement, which is of course against the weight of the electrical fixture, forces the contact members of the female assembly upwards until limited by contact with the plate 33. When the shoulders of the lugs are disengaged, the male assembly is rotated in an opposite direction, i.e. counterclockwise when viewed upwards, which moves the forward portions of the lugs out of engagement with the complementary recesses to disengage the male and female assemblies.

As can be seen, this disengagement involves three discrete motions which could not in all likelihood occur accidentally. Firstly, the ring 63 is unscrewed to release the plate 19. Secondly, the male assembly is moved upwards relative to the female assembly which is only possible after the ring 63 is released to release the plate 19 to permit the upwards movement.

Thirdly, there is relative rotation between the assemblies against weight of the fixture to effect complete disengagement initially of the shoulders, then the forward portions of the lugs prior to withdrawal of the assemblies. The three distinct motions above must be followed in sequence to effect disengagement and the chances of such motions occuring accidentally is remote. Thus the device is essentially fool-proof with regards to accidental disengagement. As can be seen, the shoulders of each female lug serve as engagement means and are complementary to the shoulders or engagement means of the respective male lug, and when engaged, serve to restrict rotation between the assemblies so as to substantially prevent accidental disconnection.

I claim:

1. An electrical fixture coupling device for coupling releasably an electrical fixture to an electrical outlet adjacent a building surface, the device having a female assembly serving as the electrical outlet and adapted to be connected to electrical power and to be attached to an outlet box, and a complementary male assembly connected to the electrical fixture, the female assembly including:
   i. a hollow body having an inner surface and upper and lower ends,
   ii. attachment means cooperating with the body for connecting the body to the outlet box so that the female assembly is essentially adjacent the building surface,
   iii. three circumferentially spaced female supporting and contacting means extending inwardly from the inner surface of the body, each supporting and contacting means having a circumferentially extending female lug having bi-directional rotation restricting engagement means and an electrically conducting resilient contact member secured adjacent the lug and adapted to be connected to an appropriate conductor, the contact member having a forward edge spaced upwards of the lug to provide a gap between the lug and the contact member, the male assembly including:
   iv. an outer plate having means to permit electrical connection to electrical conductors extending from the electrical fixture, and means adapted to carry the fixture,
   v. three similarly circumferentially spaced male supporting and contacting means extending upwards from the plate, each male supporting and contacting means having a circumferentially extending male lug having bi-directional rotation restricting engagement means complementary to the respective engagement means of the female lug and an electrically conducting contact member extending along an upper surface of the male lug and adapted to be connected to an appropriate conductor of the fixture, each lug and contact member of the male assembly being adapted to be accepted in the gap between the respective lug and contact member of the female assembly, so that when the lugs of the male assembly are moved into the respective gaps of the female assembly and the male assembly is rotated relative to the female assembly, the engagement means of each female lug engages the complementary engagement means of the respective male lug so as to restrict rotation between the male and female assemblies to prevent substantially accidental disconnection of the assemblies, and the respective contact members are forced into and maintain engagement so as to conduct electricity.

2. An electrical fixture coupling device as claimed in claim 1 being further characterized by:
   i. the hollow body having means to provide clearance for electrical conductors, ii. an inner plate having a lower surface and being adapted to fit adjacent an upper end of the hollow body so that the plate essentially seals the upper end of the body and the lower surface thereof is spaced closely to the contact member of the female assembly, so that the plate protects against accidental short-circuiting of conductors within the outlet box and the contact members of the female assembly, and the lower surface of the plate limits upward movement of the contact member of the female assembly when the male assembly is brought into engagement therewith.

3. An electrical fixture coupling device as claimed in claim 1 in which:
  i. each female lug has inner and outer peripheries, the outer periphery being generally adjacent the inner surface of the body, the lug further including a forward portion, an intermediate portion and a rear portion, the intermediate portion having an upwardly facing recess having a circumferential length, the forward portion having a nose and a ridge, the ridge defining a rear facing shoulder adjacent a forward end of the recess, the forward portion having a maximum depth defined as spacing of an uppermost surface of the ridge from an opposite lower surface of the forward portion of the lug,
  ii. the contact member of the female assembly is characterized by being secured to the rear portion of the respective female lug and extending circumferentially forward and adjacent an uppermost surface of the recess and positioned so that a portion of the male means can enter the recess of the female means, the gap to accept the male lug being defined between the ridge and an undersurface of the contact member, the contact member having an inner periphery spaced radially outwardly of the inner periphery of the lug, with the forward edge of the contact member spaced rearwardly of the nose of the respective female lug, the contact member being generally smaller than the lug so that, when viewed axially, the inner periphery of the lug extends radially inwards beyond the inner periphery of the contact member and the nose of the lug extends forwardly of the forward edge of the contact member so as to shield effectively the contact member from unintentional contact from outside the fixture,
  iii. each male lug has a forward portion, an intermediate portion and a rear portion, the intermediate portion having a downwardly facing recess spaced from an upper face of the plate so as to accept the forward portion of the female assembly, the forward portion of the male lug having a ridge defining a rear facing shoulder adjacent a forward end of the recess, length of the ridge being defined as space between the shoulder and a forward end of the forward portion, the ridge having a length less than circumferential length of the recess of the female lug to permit engagement of the shoulders of the male and female lugs and entry of the male forward portion into the recess of the female portion, the shoulders serving as respective reverse rotation restricting engagement means,
  IV. the contact member of the male assembly at the forward portion of the lug is shaped so as to be accepted in the gap between the respective ridge and contact member of the female assembly, so that when the complementary shoulders are engaged, relative rotation between the assemblies is substantially prevented and the contact member of the female assembly is maintained in contact with the respective contact member of the male assembly.

4. An electrical fixture coupling device as claimed in claim 3 in which the male assembly further includes:
  i. a cylindrical wall member extending upwards from the plate and supporting inner portions of the male lugs, the wall member having an outer diameter to fit between inwardly facing inner walls of the female lugs.

5. An electrical fixture coupling device as claimed in claim 3 in which:
  i. the forward portion of each female lug has an inclined ramp face adapted to engage the forward portion of the respective male lug to facilitate initial engagement of the male and female assemblies.

6. An electrical fixture coupling device as claimed in claim 3 in which:
  i. the forward edge of the contact member of the female assembly is a portion of an upwardly turned lip inclined away from the recess so as to lead the forward portion of the male lug and associated contact member between the female lug and associated contact member to facilitate initial engagement of the contact members of the male and female assemblies.

7. An electrical fixture coupling device as claimed in claim 3 in which:
  i. the contact member of the male assembly has a forward end having a backwardly and inwardly turned forward lip, and a rear end having a forwardly and inwardly turned rear lip,
  ii. the forward end of the male lug has a complementary recess to accept the forward lip of the contact member and the rear portion of the male lug has a complementary recess to accept the rear lip of the contact member, so as to produce a smooth nosed forward end of the male lug to facilitate engagement of the contact members of the male and female assemblies, and to locate opposite ends of the contact member relative to the male lug.

8. An electrical fixture coupling device as claimed in claim 1 in which:
  i. the three contact members of each assembly are polarized so as to be live, neutral and ground,
  ii. the ground contact member of the female assembly has a forward edge advanced circumferentially relative to the forward edges of the live and neutral contact members of the female assembly, so that when the male and female assemblies are brought into engagement, the ground contact members of both assemblies engage before the live and neutral contact members, and when the assemblies are disengaged the ground contact members disengage after the live and neutral contact members to ensure safe operation.

9. An electrical fixture coupling device as claimed in claim 1 in which:
  i. the three contact members of each assembly are polarized so as to be live, neutral and ground,
  ii. one particular lug of the male assembly has an outer wall spaced at a different radial spacing than corresponding outer walls of the remaining two lugs of the male assembly, iii. a portion of the inner surface of the hollow body extending forward of the female lug complementary to the particular male lug has a radial spacing complementary to the radial spacing of the outer wall of the particular male lug so as to accept only the particular male lug, so as to limit initial engagement of the assemblies to one relative position, thus maintaining correct polarity between conductors of the assemblies.

10. An electrical fixture coupling as claimed in claim 1 in which:
i. the means to permit electrical connection to the electrical conductors from the fixture include the outer plate having an opening to accept the conductors,
ii. the means to carry the fixture on the outer plate includes a fixture connector having a body adapted to be retained in the opening of the plate, the body having a threaded portion, the coupling further including:
iii. a convex cover plate having a central opening to accept the threaded portion of the body of the fixture connector, the plate having an outer diameter sufficient to enclose the assemblies to produce an acceptable exterior,
iv. threaded ring means complementary to the threaded portion to retain the cover plate on the threaded portion so that the outer periphery of the plate engages the building surface so as to produce a flush fitting cover plate over the coupling device.

* * * * *